US012510312B2

(12) United States Patent
Shi et al.

(10) Patent No.: US 12,510,312 B2
(45) Date of Patent: Dec. 30, 2025

(54) CONNECTOR AND HEAT EXCHANGER HAVING SAME

(71) Applicant: SANHUA (HANGZHOU) MICRO CHANNEL HEAT EXCHANGER CO., LTD., Zhejiang (CN)

(72) Inventors: Zhihao Shi, Zhejiang (CN); Qiang Gao, Zhejiang (CN); Xujiao Huang, Zhejiang (CN); Xiaoming Zhong, Zhejiang (CN)

(73) Assignee: SANHUA (HANGZHOU) MICRO CHANNEL HEAT EXCHANGER CO., LTD., Zhejiang (CN)

( * ) Notice: Subject to any disclaimer, the term of this patent is extended or adjusted under 35 U.S.C. 154(b) by 142 days.

(21) Appl. No.: 18/564,479

(22) PCT Filed: May 25, 2022

(86) PCT No.: PCT/CN2022/095085
§ 371 (c)(1),
(2) Date: Nov. 27, 2023

(87) PCT Pub. No.: WO2022/247876
PCT Pub. Date: Dec. 4, 2022

(65) Prior Publication Data

US 2024/0255238 A1 Aug. 1, 2024

(30) Foreign Application Priority Data

May 27, 2021 (CN) ......................... 202121168233.4

(51) Int. Cl.
*F16L 23/032* (2006.01)
*F28F 9/02* (2006.01)
(Continued)

(52) U.S. Cl.
CPC .............. *F28F 9/0248* (2013.01); *F28F 9/26* (2013.01); *F16L 23/032* (2013.01);
(Continued)

(58) Field of Classification Search
CPC ............. F25B 2339/0442; F28F 9/0248; F28F 9/0246; F28F 9/12; F16L 23/032
See application file for complete search history.

(56) References Cited

U.S. PATENT DOCUMENTS 6,899,169 B1 * 5/2005 Cox ...................... F28D 7/1607 165/157
10,048,009 B2 * 8/2018 Kolb ...................... F28F 9/182
2014/0007600 A1 * 1/2014 Johnson ................ F28F 9/0246 62/89

FOREIGN PATENT DOCUMENTS

CA 2308804 A1 * 11/2000 ............ F28F 9/0246
CN 201637328 U 11/2010
(Continued)

OTHER PUBLICATIONS

Translation of KR20170047963A named Translation-KR20170047963A (Year: 2017).*
(Continued)

*Primary Examiner* — Paul Alvare
(74) *Attorney, Agent, or Firm* — Bridgeway IP Law Group, PLLC; Jihun Kim

(57) ABSTRACT

A connector includes a tubular portion, a flange portion, and a first protruding portion. The tubular portion includes a first through hole and a first wall, the first wall is arranged around the first through hole, and the first wall includes a first end
(Continued)

face that includes a first opening. The flange portion is located at an end of tubular portion in an axial direction. The flange portion includes a first side face arranged around the first wall, the flange portion further includes a second end face and a third end face which are arranged in the axial direction of the tubular portion. The first protruding portion is connected to the first wall, and the first protruding portion is located outside the first through hole in the axial direction of the tubular portion.

18 Claims, 4 Drawing Sheets

(51) Int. Cl.
*F28F 9/12* (2006.01)
*F28F 9/26* (2006.01)

(52) U.S. Cl.
CPC ..... *F25B 2339/0442* (2013.01); *F28F 9/0246* (2013.01); *F28F 9/12* (2013.01)

(56) References Cited

FOREIGN PATENT DOCUMENTS

| | | | | | |
|---|---|---|---|---|---|
| CN | 201892475 | U | * | 7/2011 | |
| CN | 112164945 | A | | 1/2021 | |
| CN | 215766687 | U | | 2/2022 | |
| JP | H10-253288 | A | | 9/1998 | |
| JP | H10281687 | A | * | 10/1998 | ............ F28F 9/0246 |
| JP | 2001-355991 | A | | 12/2001 | |
| JP | 4588933 | B2 | | 12/2010 | |
| KR | 20170047963 | A | * | 5/2017 | ................ F28F 9/00 |

OTHER PUBLICATIONS

Translation of CN201892475U named Translation-CN201892475U (Year: 2011).*
Translation of JPH10281687A named Translation-JPH10281687A (Year: 1998).*
LV Liqiang, "ISR for PCT application PCT/CN2022/095085", Aug. 1, 2022, ISA/CN, WIPO, Beijing, China.
Gregor Bloch, "Search Report for EP Application No. 22810600.1", Apr. 28, 2025, EPO, Germany.

* cited by examiner

CONNECTOR AND HEAT EXCHANGER HAVING SAME

CROSS-REFERENCE TO RELATED APPLICATIONS

This application is a national phase entry under 35 USC § 371 of International Application PCT/CN2022/095085, filed on May 25, 2022, which claims the priority to and benefits of Chinese Patent Application No. 202121168233.4 filed on May 27, 2021, the entire contents of which are incorporated herein by reference.

FIELD

The present application relates to the field of heat exchange technologies, and in particular to a connector and a heat exchanger having the same.

BACKGROUND

Microchannel heat exchangers have the characteristics of high refrigeration efficiency and small volume, and their applications are developing rapidly. In some cases, it is necessary to install connectors at a collecting tube of the microchannel heat exchangers. Connectors, such as adapter seats, are often used in heat exchangers to connect the collecting tube with inlet and outlet tubes of the heat exchangers, so as to increase the strength of the joint parts and facilitate the connection to inlet and outlet tubes. Generally, the adapter seats are formed by machining. Compared to the collecting tube of the heat exchangers, the material of the adapter seats is thicker, which is not conducive to the welding connection between the collecting tube of heat exchanger and the adapter seats, and the joint parts are not easy to position.

SUMMARY

A connector according to embodiments of the present application includes a tubular portion, a flange portion and a plurality of first protruding portions. The tubular portion includes a first through hole and a first wall. The first wall is arranged around the first through hole, the first wall has a thickness in a radial direction of the first through hole, and the first wall includes a first end face including a first opening. The flange portion is located at an end of the tubular portion in an axial direction of the tubular portion, includes a first side face arranged around the first wall, and further includes a second end face and a third end face which are arranged along the axial direction of the tubular portion. The second end face and the first wall intersect at a first side edge, the second end face and the first side face intersect at a second side edge, and a perimeter of the first side edge is smaller than a perimeter of the second side edge. The third end face and the first wall intersect at a third side edge, the third end face and the first side face intersect at a fourth side edge, a perimeter of the third side edge is smaller than a perimeter of the fourth side edge. The third end face includes a second hole, and the first through hole communicates the first opening with the second hole along the axial direction of the tubular portion. The plurality of first protruding portions are arranged along a circumferential direction of the first through hole. Each first protruding portion is connected with the third end face and the first wall, and located outside the first through hole in the axial direction of the tubular portion. Each first protruding portion has a thickness in the radial direction of the first through hole, and a maximum thickness of the plurality of first protruding portions is smaller than a minimum thickness of the first wall.

A connector according to embodiments of the present application includes a tubular portion, a flange portion and a circular ring portion. The tubular portion includes a first through hole and a first wall. The first wall is arranged around the first through hole, the first wall has a thickness in a radial direction of the first through hole, and the first wall includes a first end face including a first opening. The flange portion is located at an end of the tubular portion in the axial direction of the tubular portion, includes a first side face arranged around the first wall, and further includes a second end face and a third end face which are arranged along the axial direction of the tubular portion. The second end face and the first wall intersect at a first side edge, the second end face and the first side face intersect at a second side edge, and a perimeter of the first side edge is smaller than a perimeter of the second side edge. The third end face and the first wall intersect at a third side edge, the third end face and the first side face intersect at a fourth side edge, and a perimeter of the third side edge is smaller than a perimeter of the fourth side edge. The third end face includes a second hole, and the first through hole communicates the first opening with the second hole along the axial direction of the tubular portion. The circular ring portion includes a circular ring wall connected with the third end face and the first wall. The circular ring portion is located outside the first through hole in the axial direction of the tubular portion. The circular ring portion includes a second through hole penetrating through the circular ring wall in the axial direction of the tubular portion, and the second through hole is communicated and concentrically arranged with the first through hole. The circular ring portion has a thickness in the radial direction of the first through hole, and a maximum thickness of the circular ring portion is smaller than a minimum thickness of the first wall.

A heat exchanger according to embodiments of the present application includes a connector and a collecting tube. The connector is a connector of the above embodiments, the first protruding portion or the circular ring portion of the connector is inserted into the collecting tube, and the connector is communicated with the collecting tube.

Figure 1:
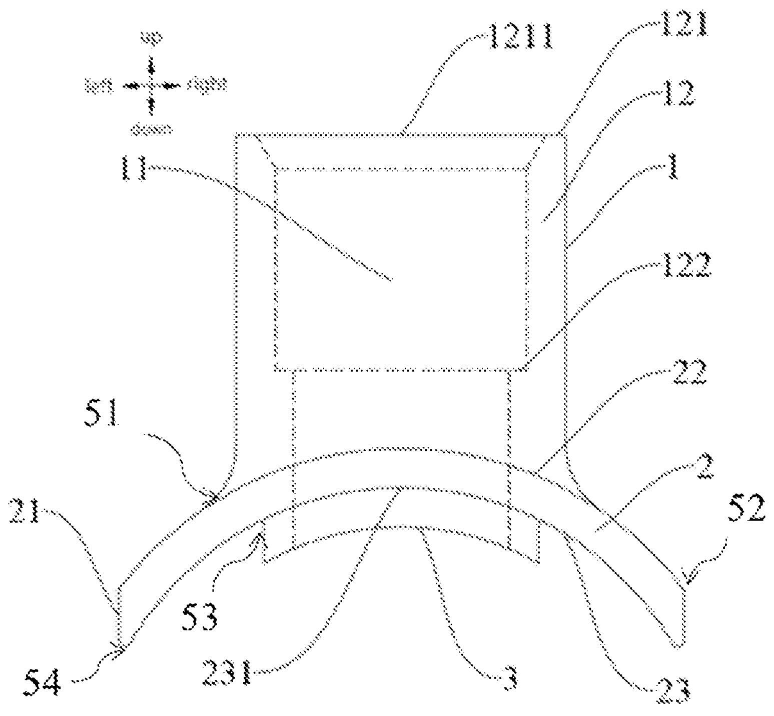
FIG. 1 is a front view of a connector according to an embodiment of the present application.

REFERENCE NUMERALS tubular portion 1, first through hole 11, first wall 12, first end face 121, first opening 1211, step portion 122, flange portion 2, first side face 21, second end face 22, third end face 23, second hole 231, first protruding portion 3, circular ring portion 4, circular ring wall 41, second protruding portion 411, second through hole 42, first side edge 51, second side edge 52, third side edge 53, fourth side edge 54, connector 100, collecting tube 200.

DETAILED DESCRIPTION

Hereinafter, embodiments of the present application will be described in detail and examples of the embodiments are illustrated in the accompanying drawings. The embodiments described below by referring to the accompanying drawings are illustrative and intended to explain the present application, but not to be construed as limitations of the present application.

In the related art, in order to connect inlet and outlet tubes with a collecting tube of heat exchangers, an adapter seat is designed to have an upper part and a lower part, in which the upper part is small and the lower part is large. A circular tube of the upper part is welded with the inlet and outlet tubes, and a circular tube of the lower part is inserted into a hole of the collecting tube. A wall thickness of the collecting tube is generally 1 mm-3 mm, which easily leads to insufficient welding length of the adapter seat and the collecting tube, and is easy to cause the welding position of the adapter seat and the collecting tube to crack due to insufficient strength in long-term use.

In order to prevent the welding position between the adapter seat and the collecting tube from cracking, some related technologies propose to add a tile-like component to form an assembly with the adapter seat. However, the tile and the adapter seat are not integrally formed, and only the overlapping area of the joint part between the tile and the adapter seat can be increased, which effectively increases the welding strength. On the other hand, the part of the adapter seat inserted into the collecting tube is too long, which hinders the refrigerant from flowing into the collecting tube, thus affecting the heat exchange performance.

In other related technologies, the tile and the adapter seat are formed into one piece, so that the overlapping area between the adapter seat and the collecting tube becomes the contact area between the tile and the collecting tube, and the welding strength is improved by increasing the size of the tile. However, in this solution, prior to the welding, it cannot be fixed with collecting tube by riveting and must be fixed with collecting tube by spot welding, which increases the production process.

Hereinafter, a connector according to embodiments of the present application will be described with reference to FIGS. 1-7.

Figure 2:
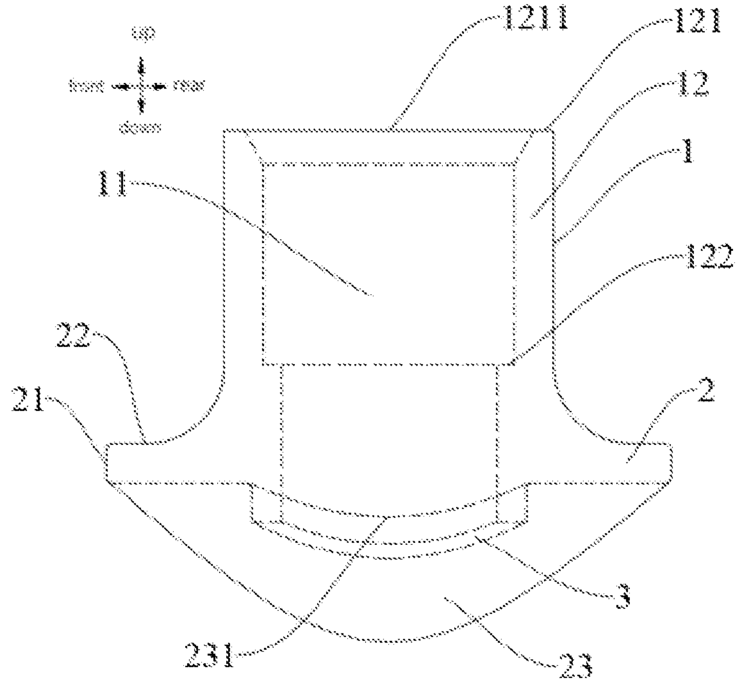
FIG. 2 is a side view of the connector in FIG. 1.
Figure 3:
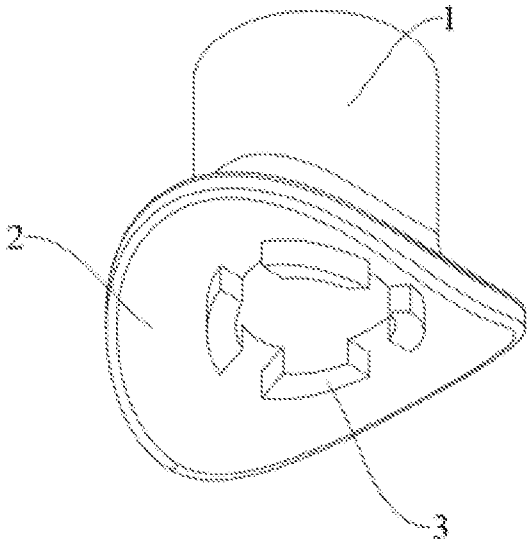
FIG. 3 is a schematic structural view of the connector in FIG. 1.

As shown in FIGS. 1-3, a connector 100 according to embodiments of the present application includes a tubular portion 1, a flange portion 2 and a first protruding portion 3.

The tubular portion 1 includes a first through hole 11 and a first wall 12, and the first wall 12 is arranged around the first through hole 11. The first wall 12 has a thickness in a radial direction of the first through hole 11, and includes a first end face 121 including a first opening 1211.

As shown in FIGS. 1-3, the first through hole 11 is arranged in an up-down direction, and a first wall 12 is arranged around a center line of the first through hole 11. The first wall 12 has a certain thickness in the radial direction of the first through hole 11 (a left-right direction in FIG. 1), and a thickness of the first wall 12 at the same height in the up-down direction is the same. An upper end face of the first wall 12 is the first end face 121, and an opening in the upper end face is the first opening 1211.

The flange portion 2 is located at an end of the tubular portion 1 in an axial direction of the tubular portion 1. The flange portion 2 includes a first side face 21, and the first side face 21 is arranged around the first wall 12. The flange portion 2 also includes a second end face 22 and a third end face 23 which are arranged along the axial direction of the tubular portion 1. The second end face 22 and the first wall 12 intersect at a first side edge 51, the second end face 22 and the first side face 21 intersect at a second side edge 52, and a perimeter of the first side edge 51 is smaller than a perimeter of the second side edge 52. The third end face 23 and the first wall 12 intersect at a third side edge 53, the third end face 23 and the first side face 21 intersect at a fourth side edge 54, and a perimeter of the third side edge 53 is smaller than a perimeter of the fourth side edge 54. The third end face 23 includes the second hole 231, and the first through hole 11 communicates the first opening 1211 with the second hole 231 along the axial direction of the tubular portion 1.

As shown in FIGS. 1-3, a lower end of the tubular portion 1 is provided with the flange portion 2, and a peripheral face of the flange portion 2 is the first side face 21. The first side face 21 is arranged around the center line of the first through hole 11, and the first side face 21 is parallel to the peripheral face of the first wall 12 in the left-right direction. An upper surface of the flange portion 2 is the second end face 22, and the second end face 22 intersects with the first wall 12 and the first side face 21 in the left-right direction. The second end face 22 intersects with the first wall 12 to form the first side edge 51, and the second end face 22 intersects with the first side face 21 to form the second side edge 52. The first side face edge and the second side face edge are opposite in the left-right direction, and the second side edge 52 is located outside the first side edge 51, that is, the perimeter of the first side edge 51 is smaller than the perimeter of the second side edge 52. A lower surface of the flange portion 2 is the third end face 23, and the third end face 23 intersects with the first wall 12 and the first side face 21 in the left-right direction. The third end face 23 intersects with the first wall 12 to form the third side edge 53, and the third end face 23 intersects with the first side face 21 to form the fourth side edge 54. The third side edge 53 and the fourth side edge 54 are opposite in the left-right direction, and the fourth side edge 54 is located outside the third side edge 53, that is, the perimeter of the third side edge 53 is smaller than the perimeter of the fourth side edge 54. A center of the third end face 23 is provided with the second hole 231, and the first through hole 11 runs up and down along the tubular portion 1 to communicate the first opening 1211 in the upper end of the first wall 12 with the second hole 231 in the third end face 23.

The first protruding portion 3 is connected with the third end face 23, and connected with the first wall 12. The first protruding portion 3 is located outside the first through hole 11 in the axial direction of the tubular portion 1. A plurality of first protruding portions 3 are provided and arranged along the circumferential direction of the first through hole 11. The first protruding portion 3 has a thickness in the radial direction of the first through hole 11, and a maximum thickness of the first protruding portion 3 is less than a minimum thickness of the first wall 12.

As shown in FIGS. 1-3, the first protruding portion 3 is arranged below the flange portion 2, an upper end of the first protruding portion 3 is connected with the first wall 12, an outer peripheral face of the first protruding portion 3 is connected with the third end face 23, and a plurality of first protruding portions 3 are arranged at intervals around the center of the first through hole 11. The plurality of first protruding portions 3 can further reduce local stress concentration and improve reliability. The first protruding portion 3 has a certain thickness in the radial direction of the first through hole 11 (the left-right direction in FIG. 1), but the maximum thickness of the first protruding portions 3 is smaller than the minimum thickness of the first wall 12, to increase the processing stress on the overall structure of the connector 100, reduce the size of the opening in the collecting tube 200 during assembly, facilitate improvement of the pressure resistance of a core, and enhance the reliability of the connector 100.

The connector 100 according to embodiments of the present application has the characteristics of convenient positioning and installation.

Figure 4:
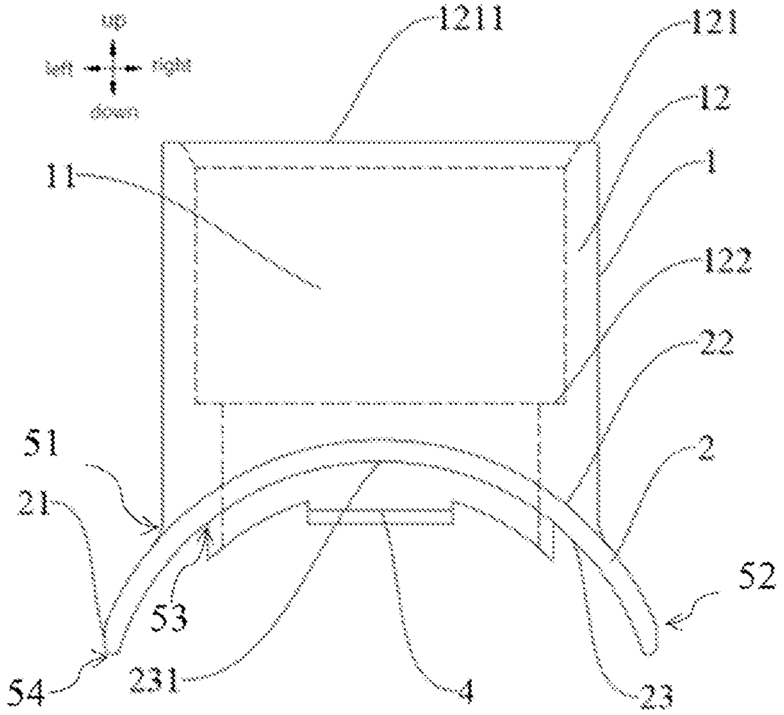
FIG. 4 is a front view of a connector according to another embodiment of the present application.
Figure 5:
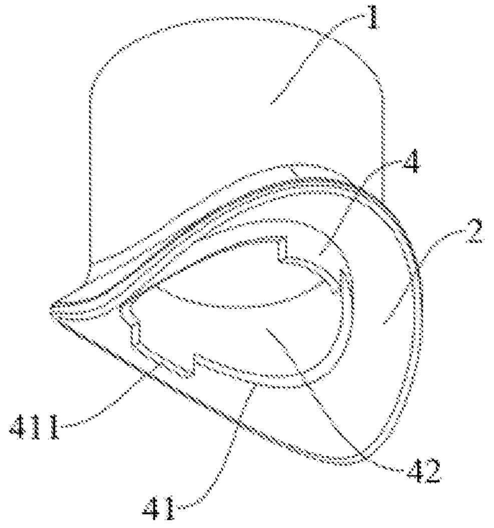
FIG. 5 is a schematic structural view of the connector in FIG. 4.
Figure 6:
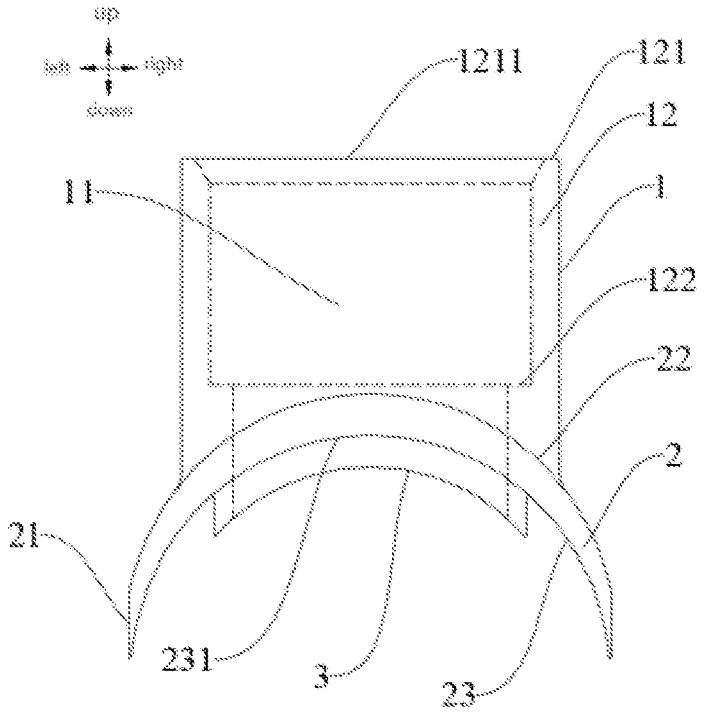
FIG. 6 is a schematic structural view of a connector according to still another embodiment of the present application.

As illustrated in FIGS. 4-6, a connector 100 according to embodiments of the present application includes a tubular portion 1, a flange portion 2 and a circular ring portion 4.

The tubular portion 1 includes a first through hole 11 and a first wall 12, and the first wall 12 is arranged around the first through hole 11. The first wall 12 has a thickness in the radial direction of the first through hole 11, and includes a first end face 121 including a first opening 1211.

As shown in FIGS. 4 and 5, the first through hole 11 is arranged in the up-down direction, and a first wall 12 is arranged around the center line of the first through hole 11. The first wall 12 has a certain thickness, and the thickness of the first wall 12 along the radial direction (the left-right direction in FIG. 1) of the first through hole 11 is the same at the same height in the up-down direction. The upper end face of the first wall 12 is the first end face 121, and the opening in the upper end face is the first opening 1211.

The flange portion 2 is located at an end of the tubular portion 1 in the axial direction of the tubular portion 1. The flange portion 2 includes a first side face 21, and the first side face 21 is arranged around the first wall 12. The flange portion 2 also includes a second end face 22 and a third end face 23 which are arranged along the axial direction of the tubular portion 1. The second end face 22 and the first wall 12 intersect at a first side edge 51, the second end face 22 and the first side face 21 intersect at a second side edge 52, and the perimeter of the first side edge 51 is smaller than the perimeter of the second side edge 52. The third end face 23 and the first wall 12 intersect at the third side edge 53, the third end face 23 and the first side face 21 intersect at the fourth side edge 54, and the perimeter of the third side edge 53 is smaller than the perimeter of the fourth side edge 54. The third end face 23 includes the second hole 231, and the first through hole 11 communicates the first opening 1211 with the second hole 231 along the axial direction of the tubular portion 1.

As shown in FIGS. 4 and 5, the lower end of the tubular portion 1 is provided with the flange portion 2, and the peripheral face of the flange portion 2 is the first side face 21. The first side face 21 is arranged around the center line of the first through hole 11, and the first side face 21 is parallel to the peripheral face of the first wall 12 in the left-right direction. The upper surface of the flange portion 2 is the second end face 22, and the second end face 22 intersects with the first wall 12 and the first side face 21 in the left-right direction. The second end face 22 intersects with the first wall 12 to form the first side edge 51, and the second end face 22 intersects with the first side face 21 to form the second side edge 52. The first side edge 51 and the second side edge 52 are opposite in the left-right direction, and the second side edge 52 is located outside the first side edge 51, that is, the perimeter of the first side edge 51 is smaller than the perimeter of the second side edge 52. The lower surface of the flange portion 2 is the third end face 23, and the third end face 23 intersects with the first wall 12 and the first side face 21 in the left-right direction. The third end face 23 intersects with the first wall 12 to form the third side edge 53, and the third end face 23 intersects with the first side face 21 to form the fourth side edge 54. The third side edge 53 and the fourth side edge 54 are opposite in the left-right direction, and the fourth side edge 54 is located outside the third side edge 53, that is, the perimeter of the third side edge 53 is smaller than the perimeter of the fourth side edge 54. The center of the third end face 23 is provided with the second hole 231, and the first through hole 11 runs up and down along the tubular portion 1 to communicate the first opening 1211 in the upper end of the first wall 12 with the second hole 231 in the third end face 23.

The circular ring portion 4 includes a circular ring wall 41, and the circular ring wall 41 is connected with the third end face 23 and the first wall 12. The circular ring portion 4 is located outside the first through hole 11 in the axial direction of the tubular portion 1, and the circular ring portion 4 includes a second through hole 42. The second through hole 42 penetrates through the circular ring wall 41 in the axial direction of the tubular portion 1, and the second through hole 42 is communicated and concentrically arranged with the first through hole 11. The circular ring portion 4 has a thickness in the radial direction of the first through hole 11, and a maximum thickness of the circular ring portion 4 is smaller than a minimum thickness of the first wall 12.

As shown in FIG. 4 and FIG. 5, the circular ring portion 4 is arranged below the flange portion 2, the upper end of the circular ring wall 41 is connected with the first wall 12, and the circular ring wall 41 is connected with the third end face 23. The center of the circular ring portion 4 is provided with the second through hole 42, the second through hole 42 penetrates through the circular ring wall 41 in the up-down direction. The upper end of the second through hole 42 is communicated with the lower end of the first through hole 11, and the second through hole 42 is concentrically arranged with the first through hole 11. The circular ring portion 4 has a thickness in the radial direction of the first through hole 11 (the left-right direction in FIG. 1), but the maximum thickness of the circular ring portion 4 is smaller than the minimum thickness of the first wall 12, to increase the processing stress on the overall structure of the connector 100, reduce the size of the opening on the collecting tube 200 during assembly, and facilitate improvement of the pressure resistance of the core. By providing the circular ring portion 4, the contact area with the collecting tube 200 when welding can be increased, and the reliability of the connector 100 can be enhanced.

The connector 100 according to embodiments of the present application has the characteristics of stable structure, strong reliability and little influence on the flow of fluid in the collecting tube 200.

In some embodiments, the first protruding portion 3 and the circular ring portion 4 can be obtained by extruding the material of the tubular portion. In some embodiments, the first protruding portion 3 is formed by extruding the material of an inner wall of the tubular portion, which reduces the stress concentration on the connector compared with machining work, and is beneficial to improving the structural strength and saving materials.

In some embodiments, the circular ring wall 41 includes a second protruding portion 411, and the second protruding portion is located at an end of the circular ring wall 41 away from the flange portion 2. A plurality of second protruding portions 411 are provided and arranged along the circumferential direction of the first through hole 11.

As shown in FIGS. 4 and 5, the lower end of the circular ring wall 41 is also provided with the plurality of second protruding portions 411, and the plurality of second protruding portions are arranged at even intervals around the center of the first through hole 11. The second protruding portions 411 can expand outward along the radial direction of the first through hole 11 to reduce the influence on the flow of fluid in the collecting tube 200.

In some embodiments, a hydraulic diameter of the second through hole 42 is smaller than a hydraulic diameter of the first opening 1211.

The second through hole 42 communicates with the collecting tube 200, and the hydraulic diameter of the first opening 1211 is larger than the hydraulic diameter of the second through hole 42, which can reduce the pressure at the second through hole 42, improve the strength of the joint part, reduce the obstruction of the connector 100 when the refrigerant enters the collecting tube 200, and reduce the influence on the heat exchange effect.

In some embodiments, at least one longitudinal section of the flange portion 2 includes a sector ring face, the longitudinal section is parallel to the axial direction of the tubular portion 1, and the sector ring face at least includes two circular arcs. The two circular arcs protrude towards the first end face 121 in the axial direction of the tubular portion 1.

As shown in FIG. 1 and FIG. 4, one or more longitudinal sections of the flange portion 2 along the up-down direction are the sector ring face, and an upper side and a lower side of the sector ring face are circular arcs which protrude upwards, and the height of the sector ring face in the up-down direction is consistent. As shown in FIG. 6, one or more longitudinal sections of the flange portion 2 in the up-and-down direction are a crescent face, and an upper side and a lower side of the crescent face are circular arcs which protrude upward, and the height of the crescent face is inconsistent in the up-down direction. The height of the crescent face gradually increases in a direction from the positions far away from the center line of the tubular portion 1 to the center line of the tubular portion 1, so that the structure of the connector 100 is more stable, the stress is mainly concentrated on the edge of the flange portion 2, and the connector 100 is not easy to fall off during use. Moreover, the less material is used, and it is easier to perform mold stamping forming.

In some embodiments, the flange portion 2 is formed by extruding the material of the tubular portion, and in other embodiments, the protruding portion or the circular ring portion and the flange portion are formed by integrally extruding the material of the tubular portion. Compared with the machined connector, such connector saves processing materials, and is integrally formed, which improves the overall strength and reduces the stress concentration distribution on the connector.

In some embodiments, a plane perpendicular to an axis direction (i.e., the axial direction of the tubular portion) is defined as a first plane, a projection of the flange portion 2 on the first plane is ellipse or nearly elliptical, a thickness of the first wall 12 is T, and a length of a short axis of the ellipse is not less than a sum of 4T and a diameter of the first through hole 11.

Figure 7:
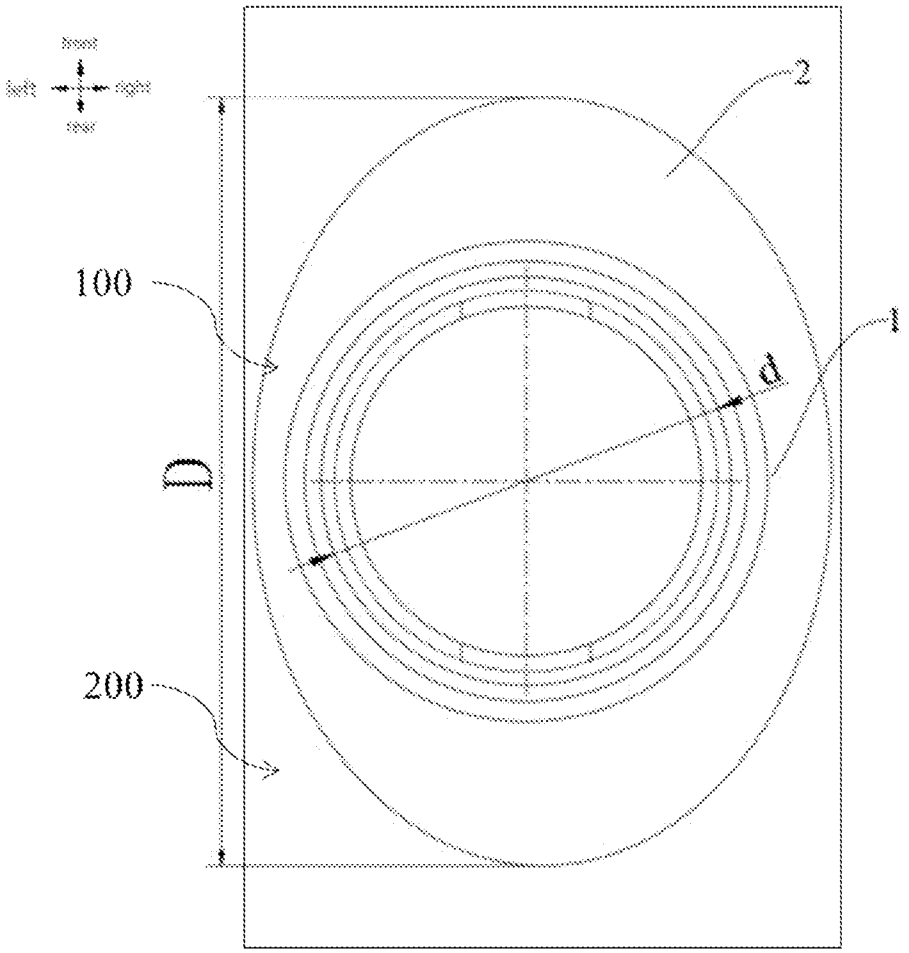
FIG. 7 is a schematic structural view of a connector according to yet another embodiment of the present application.

As shown in FIG. 7, the flange portion 2 and the collecting tube 200 are connected together by welding. When the first plane is horizontal, the projection of the flange portion 2 on the horizontal plane is ellipse or nearly elliptical, which can make the distribution of solder on the contact face between the flange portion 2 and the collecting tube 200 more uniform and improve the connection strength between the flange portion 2 and the collecting tube 200. When the thickness of the first wall 12 is T, the length of the short axis of the ellipse is greater than or equal to the sum of 4T and the diameter of the first through hole 11, which, at this time, can ensure that the overall heating of the connector 100 is easy during high-temperature welding, the welding quality is good, and the welding qualification rate is high.

In some embodiments, a length of a long axis of the ellipse is greater than twice the diameter of the first through hole 11. As shown in FIG. 7, the length of the long axis of the projection of the flange portion 2 on the horizontal plane is D, the diameter of the first through hole 11 is d, and Dis greater than 2d, to improve the strength of the joint part between the flange portion 2 and the collecting tube 200 and enhance the use reliability of the connector 100.

In some embodiments, the first wall 12 includes a step portion 122 located in the first through hole 11, the step portion 122 protrudes from the first wall 12 in the radial direction of the first through hole 11 and extends in the axial direction of the first through hole 11, and the diameter of the first through hole 11 at the step portion 122 is smaller than a diameter of the first opening 1211.

As shown in FIGS. 1-6, the first wall 12 is provided with the step portion 122, and the step portion 122 extends downward to a second opening, and an external tube is inserted into the tubular portion 1. A diameter of a downward portion of the step portion 122 is smaller than the diameter of the first opening 1211, so that an end of the external tube abuts on the step portion 122, which is easy to install and improves the working efficiency.

The heat exchanger according to embodiments of the present application includes a connector 100 and a collecting tube 200. The connector 100 is a connector 100 described above, the first protruding portion 3 or the circular ring portion 4 of the connector 100 is inserted into the collecting tube 200, and the connector 100 is communicated with the collecting tube 200.

The heat exchanger according to embodiments of the present application has the characteristics of simple installation, uniform heat exchange and long service life.

In some embodiments, the heat exchanger is a microchannel heat exchanger, and the first protruding portion 3 or the circular ring portion 4 of the connector 100 has a flared portion (not shown in the figures), and the flared portion is located in the collecting tube 200.

As shown in FIG. 3 and FIG. 5, an equivalent diameter of a channel of the heat exchanger is 10-1000 μm, and an outer side of the first protruding portion 3 or the circular ring portion 4 of the connector 100 is provided with the flared portion, and the flared portion can be flared outward after being inserted into the collecting tube 200, so that the connection strength between the flange portion 2 and the collecting tube 200 at the same time of installation and positioning can be improved and the service life of the heat exchanger can be prolonged.

In the description of the present disclosure, it should be understood that the orientation or positional relationship indicated by the terms "center", "longitudinal", "transverse", "length", "width", "thickness", "up", "down", "front", "rear", "left", "right", "vertical", "horizontal", "top", "bottom", "inside", "outside", "clockwise", "counter-clockwise", "axial", "radial" and "circumferential" and the like, is based on the orientation or positional relationship shown in the attached drawings, which is only for the convenience of describing the present disclosure and simplifying the description, and does not indicate or imply that the referred device or element must have a specific orientation, and be constructed and operated in a specific orientation, so it cannot be understood as a limitation of the present disclosure.

In addition, the terms "first" and "second" are only used for purpose of description, and cannot be understood as indicating or implying relative importance or implicitly indicating the number of indicated technical features. Therefore, the feature defined as "first" or "second" may explicitly or implicitly include at least one such feature. In the description of the present disclosure, "a plurality of" means at least two, such as two, three, etc., unless otherwise specifically defined.

In the present disclosure, unless otherwise expressly defined, terms such as "install", "interconnect", "connect", "fix" shall be understood broadly, and may be, for example, fixed connections, detachable connections, or integral connections: may also be mechanical or electrical connections or intercommunication: may also be direct connections or indirect connections via intervening media: may also be inner communications or interactions of two elements. For those skilled in the art, the specific meaning of the above terms in the present disclosure can be understood according to the specific situations.

In the present disclosure, unless otherwise expressly defined and specified, a structure in which a first feature is "on" or "below" a second feature may include an embodiment in which the first feature is in direct contact with the second feature, or may further include an embodiment in which the first feature and the second feature are in indirect contact through intermediate media. Furthermore, a first feature "on", "above", or "on top of" a second feature may include an embodiment in which the first feature is right or obliquely "on", "above", or "on top of" the second feature, or just means that the first feature is at a height higher than that of the second feature, while a first feature "below", "under", or "on bottom of" a second feature may include an embodiment in which the first feature is right or obliquely "below", "under", or "on bottom of" the second feature, or just means that the first feature is at a height lower than that of the second feature.

In the description of the present disclosure, terms such as "an embodiment", "some embodiments", "an example", "a specific example" or "some examples" means that a particular feature, structure, material, or characteristic described in connection with the embodiment or example is included in at least one embodiment or example of the present disclosure. Thus, the appearances of these terms in various places throughout this specification are not necessarily referring to the same embodiment or example of the present disclosure. Furthermore, the particular features, structures, materials, or characteristics may be combined in any suitable manner in one or more embodiments or examples. In addition, without contradiction, those skilled in the art may combine and unite different embodiments or examples or features of the different embodiments or examples described in this specification.

Although the embodiments of the present disclosure have been shown and described above, it can be understood that the above embodiments are illustrative and shall not be understood as limitation to the present disclosure, and changes, modifications, alternatives and variations can be made in the above embodiments within the scope of the present disclosure by those skilled in the art.

What is claimed is:

1. A connector, comprising:

a tubular portion comprising a first through hole and a first wall, the first wall being arranged around the first through hole, the first wall having a thickness in a radial direction of the first through hole, the first wall comprising a first end face, the first end face comprising a first opening;

a flange portion positioned at an end of the tubular portion in an axial direction of the tubular portion and comprising a first side face, the first side face being arranged around the first wall, the flange portion further comprising a second end face and a third end face which are arranged along the axial direction of the tubular portion, wherein the second end face and the first wall intersect at a first side edge, the second end face and the first side face intersect at a second side edge, and a perimeter of the first side edge is smaller than a perimeter of the second side edge, wherein the third end face and a projection of the first wall intersect at a third side edge, the projection of the first wall being in a plane perpendicular to the axial direction of the tubular portion, the third end face and the first side face intersect at a fourth side edge, a perimeter of the third side edge is smaller than a perimeter of the fourth side edge, the third end face comprises a second hole, and the first through hole communicates the first opening with the second hole along the axial direction of the tubular portion; and a plurality of first protruding portions arranged along a circumferential direction of the first through hole, each first protruding portion being connected with the third end face and the first wall and positioned outside the first through hole in the axial direction of the tubular portion, each first protruding portion having a thickness in the radial direction of the first through hole, a maximum thickness of each of the plurality of first protruding portions being smaller than a minimum thickness of the first wall, wherein the plane perpendicular to the axial direction of the tubular portion is defined as a first plane, a projection of the flange portion on the first plane is ellipse or nearly elliptical, the thickness of the first wall is T, and a length of a short axis of the ellipse is not less than a sum of 4T and a diameter of the first through hole.

2. A connector, comprising:

a tubular portion comprising a first through hole and a first wall, the first wall being arranged around the first through hole, the first wall having a thickness in a radial direction of the first through hole, the first wall comprising a first end face, the first end face comprising a first opening;

a flange portion positioned at an end of the tubular portion in an axial direction of the tubular portion and comprising a first side face, the first side face being arranged around the first wall, the flange portion further comprising a second end face and a third end face which are arranged along the axial direction of the tubular portion, wherein the second end face and the first wall intersect at a first side edge, the second end face and the first side face intersect at a second side edge, and a perimeter of the first side edge is smaller than a perimeter of the second side edge, wherein the third end face and a projection of the first wall intersect at a third side edge, the projection of the first wall being in a plane perpendicular to the axial direction of the tubular portion, the third end face and the first side face intersect at a fourth side edge, a perimeter of the third side edge is smaller than a perimeter of the fourth side edge, the third end face comprises a second hole, and the first through hole communicates the first opening with the second hole along the axial direction of the tubular portion; and a circular ring portion comprising a circular ring wall connected with the third end face and the first wall, the circular ring portion being positioned outside the first through hole in the axial direction of the tubular portion, the circular ring portion comprising a second through hole penetrating through the circular ring wall in the axial direction of the tubular portion, wherein the second through hole is communicated and concentrically arranged with the first through hole, the circular ring portion has a thickness in the radial direction of the first through hole, and a maximum thickness of the circular ring portion is smaller than a minimum thickness of the first wall, wherein the plane perpendicular to the axial direction of the tubular portion is defined as a first plane, a projection of the flange portion on the first plane is ellipse or nearly elliptical, the thickness of the first wall is T, and a length of a short axis of the ellipse is not less than a sum of 4T and a diameter of the first through hole.

3. The connector according to claim 2, wherein the circular ring wall comprises a plurality of second protruding portions arranged along a circumferential direction of the first through hole, each second protruding portion being positioned at an end of the circular ring wall away from the flange portion.

4. The connector according to claim 3, wherein a hydraulic diameter of the second through hole is smaller than a hydraulic diameter of the first opening.

5. The connector according to claim 2, wherein at least one longitudinal section of the flange portion comprises a sector ring face, the at least one longitudinal section of the flange portion is parallel to the axial direction of the tubular portion, the sector ring face comprises at least two circular arcs, and the at least two circular arcs protrude towards the first end face in the axial direction of the tubular portion.

6. The connector according to claim 2, wherein a length of a long axis of the ellipse is more than twice the diameter of the first through hole.

7. The connector according to claim 2, wherein the first wall comprises a step portion positioned in the first through hole, the step portion protrudes from the first wall along the radial direction of the first through hole and extends along an axis direction of the first through hole, and a diameter of the first through hole at the step portion is smaller than a diameter of the first opening.

8. A heat exchanger, comprising:

a connector according to claim 1; and a collecting tube, wherein the plurality of first protruding portions of the connector is inserted into the collecting tube, and the connector is communicated with the collecting tube.

9. The heat exchanger according to claim 8, wherein the heat exchanger is a microchannel heat exchanger, and each first protruding portion of the connector has a flared portion, and the flared portion is positioned in the collecting tube.

10. The connector according to claim 1, wherein at least one longitudinal section of the flange portion comprises a sector ring face, the at least one longitudinal section of the flange portion is parallel to the axial direction of the tubular portion, the sector ring face comprises at least two circular arcs, and the at least two circular arcs protrude towards the first end face in the axial direction of the tubular portion.

11. The connector according to claim 10, wherein a height of the sector ring face in the axial direction of the tubular portion is consistent.

12. The connector according to claim 1, wherein a length of a long axis of the ellipse is more than twice the diameter of the first through hole.

13. The connector according to claim 1, wherein the first wall comprises a step portion positioned in the first through hole, the step portion protrudes from the first wall along the radial direction of the first through hole and extends along an axis direction of the first through hole, and a diameter of the first through hole at the step portion is smaller than a diameter of the first opening.

14. The connector according to claim 1, wherein a thickness of the first wall at a same height in the axial direction of the tubular portion is consistent.

15. The connector according to claim 1, wherein at least one longitudinal section of the flange portion comprises a crescent face, the at least one longitudinal section of the flange portion is parallel to the axial direction of the tubular portion, the crescent face comprises at least two circular arcs, and the at least two circular arcs protrude towards the first end face in the axial direction of the tubular portion.

16. The connector according to claim 15, wherein when viewed from a front of the connector, a height of the crescent face increases in a direction from positions away from a center axial line of the tubular portion to the center axial line of the tubular portion.

17. A heat exchanger, comprising:

a connector according to claim 2; and a collecting tube, wherein the circular ring portion of the connector is inserted into the collecting tube, and the connector is communicated with the collecting tube.

18. The heat exchanger according to claim 17, wherein the heat exchanger is a microchannel heat exchanger, and the circular ring portion of the connector has a flared portion, and the flared portion is positioned in the collecting tube.

* * * * *